P. M. BUSH.
GAGE FOR GASOLENE TANKS.
APPLICATION FILED DEC. 5, 1911.

1,072,819.

Patented Sept. 9, 1913.

WITNESSES:
Louis Lucia
M. A. Shuckerow

INVENTOR.
Philip M. Bush.
BY
Arthur B. Jenkins
ATTORNEY.

UNITED STATES PATENT OFFICE.

PHILIP M. BUSH, OF HARTFORD, CONNECTICUT, ASSIGNOR TO THE BUSH MANUFACTURING COMPANY, OF HARTFORD, CONNECTICUT, A CORPORATION OF CONNECTICUT.

GAGE FOR GASOLENE-TANKS.

1,072,819.      Specification of Letters Patent.      Patented Sept. 9, 1913.

Application filed December 5, 1911. Serial No. 664,030.

*To all whom it may concern:*

Be it known that I, PHILIP M. BUSH, a citizen of the United States, and a resident of Hartford, in the county of Hartford and State of Connecticut, have invented a new and Improved Gage for Gasolene-Tanks, of which the following is a specification.

My invention relates more especially to that class of gages employed to indicate an amount of gasolene in a tank and the object of my invention, among others, is to provide a simple and effective device of this class which will accurately indicate the amount of gasolene within the tank and which will also attract attention when the amount of gasolene is getting extremely low.

One form of device embodying my invention and in the construction and use of which the objects above set out, as well as others, may be attained, is illustrated in the accompanying drawings, in which—

Figure 1:
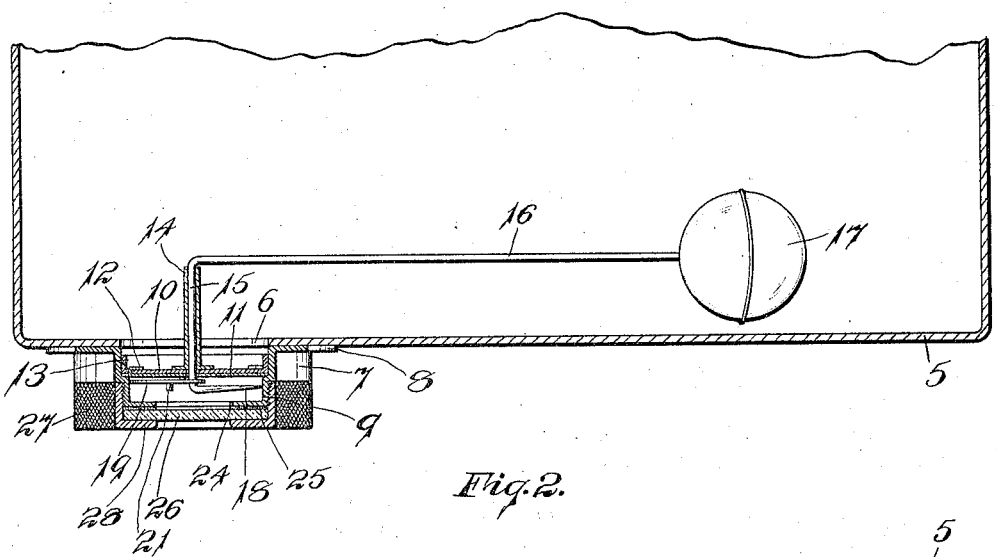
Figure 2:
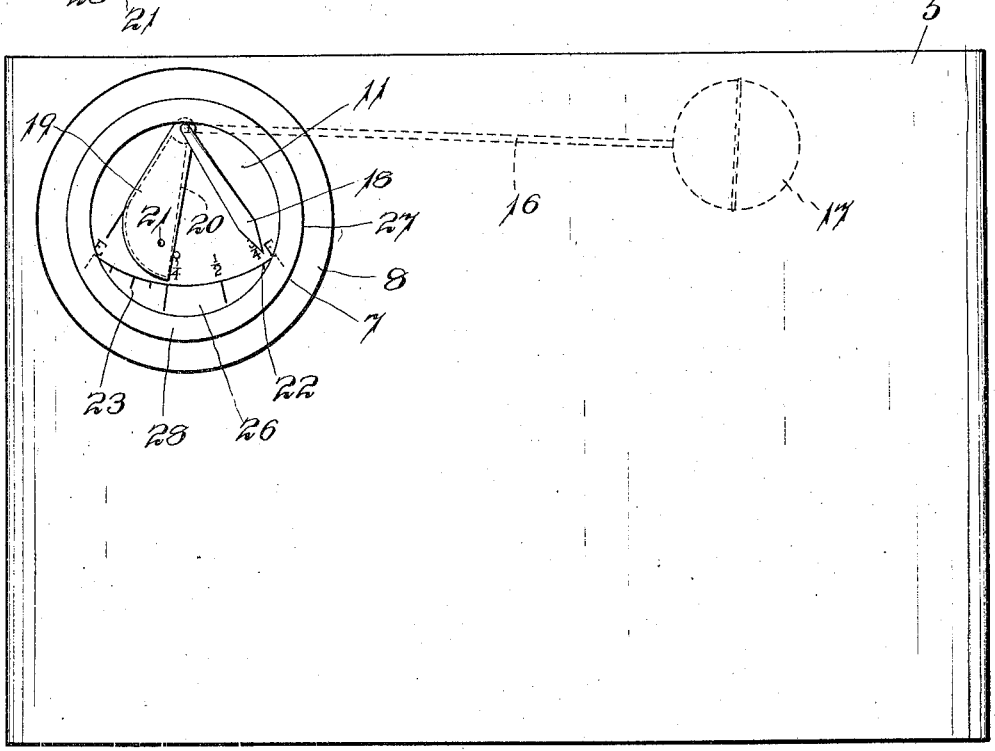

Figure 1 is a view in horizontal section through a portion of a tank with my improved gage applied thereto. Fig. 2 is a view in side elevation of said tank.

In the accompanying drawings the numeral 5 denotes a tank having an opening 6 through one wall.

A casing 7 is tightly secured to the outer surface of the tank as by means of a flange 8 soldered or otherwise fastened in place, this casing having a reduced outer end 9 forming a shoulder on its inner and outer side. A supporting base 10 is located within the casing, this base being struck to form from sheet metal and having a flange tightly fitting within the casing, being held in place by the closeness of its fit or by brazing or other fastening if desired. A dial plate 11 is placed between the base and the shoulder above referred to formed on the inner surface of the casing, this shoulder providing an abutment against which the supporting base and dial rest. The dial may be secured to said base as by means of clips 12 from the dial plate passing through the base and bent on the back side. The side walls 13 of the base are of sufficient length to provide for it a substantial bearing and hold it rigidly in place in the casing.

A sleeve 14 projects from the back of the supporting base and contains a spindle 15 to which a float arm 16 supporting a float 17 is secured. An indicating pointer 18 is secured to the spindle 15, the spindle, float arm and pointer being, in fact, formed from a single piece or rod bent to proper shape and its end being flattened to form the indicating pointer. A shield 19 is loosely mounted on said spindle and covers a sector 20 of contrasting color to that of the dial plate 11. A pin 21 projects outwardly from the face of the shield into the path of movement of the hand or pointer 18, so that when the pointer reaches a certain position it will encounter this pin and move the shield to uncover the colored sector and at a time when the gasolene in the tank is reduced to a certain point, say three-fourths empty. Graduations 22 may be employed to denote the amount in quarters of the contents of the tank, the last quarter having graduations 23 to denote the condition of the contents of this quarter.

The casing 7 has a lip 24 projecting inward and forming a seat for a packing 25 and a glass disk 26, this packing and glass disk being clamped firmly against the seat afforded by the lip 24, as by means of a flange 28 overturned from a collar 27 screw threaded on to the reduced outer end of the casing and seated against the shoulder formed on the outer side of said casing by said reduced end. This collar in fact forms a part of said casing, constituting the outer end thereof.

The spindle 15 is so located on the tank that when the latter is full the float arm 16 will rest in substantially a horizontal position, the float being pressed against the cover of the tank, and thus forcibly submerged. In the position of the parts shown in Fig. 2 the parts have the position assumed when the contents of the tank have been partially removed. This disposition of the dial is of an advantage in determining the exact condition as to the quantity of the contents in the tank at the time when the tank is getting empty, as the distance the pointer will move when the last quarter part of the contents of the tank are being consumed will be greater than the distance it will move while the first quarter of the contents of the tank are being consumed, and greater than the distance the pointer will move while any of the other quarter parts of the contents of the tank are being consumed. The forceful submerging of the float by reason of its contact with the top of the tank when the latter is full permits a reduction of a part of the contents without any indication of that fact by the pointer, which fact is immaterial so far as the knowledge of its contents is concerned, but when the last quarter part of the contents are being consumed it becomes material that the exact condition be known and in thus providing for the movement of the pointer a substantial distance, during this period one is enabled to determine to a nicety just how much of the contents remain, and this fact may be indicated to a nicety by the graduations 23.

I do not consider that a device must be constructed exactly as illustrated and described herein, as this construction may be departed from to a greater or lesser degree and yet embody the invention.

I claim—

1. A tank having an opening therethrough, a casing secured to and covering said opening, a spindle having one end projecting within the casing, a pivotal support for said spindle, a float and float rod supported by the spindle, an indicating hand secured to the spindle, a shield pivotally mounted on the spindle and arranged to be engaged and moved by the indicating hand at a predetermined time, and a sector of distinguishing character covered by said shield.

2. A tank having an opening through the wall thereof, a casing covering said opening, a spindle supported by said casing and with one end projecting thereinto, a float and float rod supported by said spindle, an indicating hand secured to the spindle, a shield pivotally mounted on the spindle, a stop to limit the downward movement of the shield, a pin mounted to impart movement of the pointer to the shield, and a sector of distinguishing character underlying said shield.

3. A tank having an opening through its wall, a casing secured to the outer surface of the tank about said opening and having a shoulder facing inward, a supporting base snugly fitting within said casing against said shoulder, a sleeve rigidly secured to and projecting from said base, a spindle supported in said sleeve, a float arm secured to one end of the spindle and bearing a float, and a pointer secured to the opposite end of the spindle.

4. A tank having an opening through its wall, a casing secured to the outer surface of the tank about said opening and having an inward facing shoulder and a reduced outer end forming a shoulder, a supporting base snugly fitted within the casing against said inward facing shoulder, a spindle pivotally supported in said base, a float arm secured to one end of the spindle and bearing a float, a pointer secured to the opposite end of the spindle, and a cap fitted upon the reduced outer end of the casing and resting against the shoulder on the outer surface thereof.

5. A tank having an opening through its wall, a casing secured to the outer surface of the tank and covering said opening and having a shoulder on its inner surface, a supporting base snugly fitted within the casing and resting against said shoulder, a lip formed at the outer end of the casing, a glass resting against said lip forming a chamber between said glass and supporting base, a packing for the joint around said glass, means for holding the glass front against its seat, a pointer in said chamber, a spindle bearing said pointer and mounted in the supporting base, and a float arm secured to said spindle and bearing a float within said tank.

6. A tank having an opening through the wall thereof, a casing secured to and covering said opening, a spindle having one end projecting within the casing, a pointer secured to the opposite end of the spindle, a pivotal support for said spindle, a float and float arm supported by the spindle, a shield mounted in the casing and arranged to be operated by the movement of said spindle, and a sector of distinguishing character located to be covered and uncovered by said shield.

PHILIP M. BUSH.

Witnesses:
E. L. STOUGHTON,
E. F. EATON.